United States Patent [19]

Bernu

[11] Patent Number: 5,851,959

[45] Date of Patent: Dec. 22, 1998

[54] HIGH TEMPERATURE STABLE MODIFIED STARCH POLYMERS AND WELL DRILLING FLUIDS EMPLOYING SAME

[75] Inventor: Cory J. Bernu, Farmington, Minn.

[73] Assignee: Chemstar Products Company, Minneapolis, Minn.

[21] Appl. No.: 778,555

[22] Filed: Jan. 3, 1997

[51] Int. Cl.$^6$ .............................. C09K 7/02; C08B 31/00
[52] U.S. Cl. ...................... 507/111; 507/212; 536/106; 536/107; 536/111
[58] Field of Search ................................. 507/111, 212; 536/106, 107, 111

[56] References Cited

U.S. PATENT DOCUMENTS

| | | | |
|---|---|---|---|
| 2,853,484 | 9/1958 | Lolkema et al. | 536/106 |
| 2,935,510 | 5/1960 | Wurzburg et al. | 536/106 |
| 3,555,009 | 1/1971 | Suzuki et al. | 536/106 |
| 3,951,947 | 4/1976 | Schanefelt et al. | 260/233 |
| 4,016,354 | 4/1977 | Greenwood | 536/111 |
| 4,123,366 | 10/1978 | Sauber et al. | 252/8.5 |
| 4,296,234 | 10/1981 | Mindt et al. | 536/106 |
| 4,339,331 | 7/1982 | Lim et al. | 209/167 |
| 4,422,947 | 12/1983 | Dorsey et al. | 252/8.5 |
| 4,428,972 | 1/1984 | Wurzburg et al. | 426/578 |
| 4,600,515 | 7/1986 | Gleason et al. | 252/8.5 |
| 4,652,384 | 3/1987 | Francis et al. | 252/8.5 |
| 4,652,623 | 3/1987 | Chen et al. | 526/287 |
| 4,822,500 | 4/1989 | Dobsen, Jr. et al. | 252/8.551 |
| 4,841,040 | 6/1989 | Just et al. | 536/105 |
| 4,940,741 | 7/1990 | De Wacker et al. | 524/47 |
| 4,988,450 | 1/1991 | Wingrave et al. | 252/8.514 |
| 5,009,911 | 4/1991 | Mauro et al. | 426/578 |
| 5,085,228 | 2/1992 | Mooney et al. | 131/37 |
| 5,132,285 | 7/1992 | Tsai | 507/121 |
| 5,164,433 | 11/1992 | Ricci et al. | 524/47 |
| 5,185,176 | 2/1993 | Chiu | 426/651 |
| 5,192,576 | 3/1993 | Chang et al. | 426/578 |
| 5,470,968 | 11/1995 | Katcher et al. | 536/102 |
| 5,616,541 | 4/1997 | Dobson, Jr. et al. | 507/111 |
| 5,641,728 | 6/1997 | Dobson, Jr. et al. | 507/111 |
| 5,658,859 | 8/1997 | Burba, III et al. | 507/111 |

FOREIGN PATENT DOCUMENTS

| | | |
|---|---|---|
| 1447908 | 9/1976 | United Kingdom . |

OTHER PUBLICATIONS

John Borchardt, "Chemicals Used in Oil–Field Operations" Chapter 1 of Oil–Field Chemistry, (1989) American Chemical Society.

Weldon M. Harms, "Application of Chemistry in Oil and Gas Well Fracturing", Chapter 2 of Oil–Field Chemistry, (1989) American Chemical Society.

Derwent WPI, Abstract of FR 830520; Mar. 20, 1983.

JAPIO, Astract of JP 4023951 A, published Jan. 28, 1992.

O.B. Worzburg, Modified Starches:Popoerties and Uses, "Starch Sources and Granule Appearance", CRC Press, (1986), pp. 4–10.

Chem. Abst. 116: 104618, Abstracting Cereal Foods World (1991), 36(8), 631, 633, 636, 638–639.

Derwent WPI Abstract, Abstract of RO 84741, Sep. 30, 1984.

Japio, Abstract of JP 61254602, published Nov. 12, 1986.

Derwent WPI, Abstract of RO 84742, Sep. 30, 1984.

Derwent WPI, Abstract of FR 2516533, May 20, 1983.

JAPIO, Abstract of JP 570633303, published Apr. 16, 1982.

Primary Examiner—Philip Tucker
Attorney, Agent, or Firm—Vidas, Arrett & Steinkraus

[57] ABSTRACT

A modified starch polymer derived from an unmodified starch having an amylopectin content of at least 80% by weight. The starch is modified by crosslinking with epichlorohydrin, the amount of epichlorohydrin crosslinking being equivalent to that which is obtained when a crosslinking reaction is subjected to a Brabender viscosity which reaches a maximum value and then is reduced with further crosslinking from its maximum to a value which is no more than 50% of the maximum value, and is carboxymethylated with a degree of substitution of at least 0.1 carboxymethyl groups per anhydroglucose unit. Fermentation stability is obtained when the degree of carboxymethyl substitution is about 0.4 or more. The modified starch polymer may also be hydroxypropylated. The modified starch polymers provide improved high temperature fluid loss performance when incorporated into well drilling fluids. They may also be used in other applications for which cellulosic polymers have heretofore been employed because of their better high temperature tolerance compared to conventional starch polymers.

21 Claims, No Drawings

5,851,959

HIGH TEMPERATURE STABLE MODIFIED STARCH POLYMERS AND WELL DRILLING FLUIDS EMPLOYING SAME

FIELD OF THE INVENTION

This invention relates to modified starches used in well drilling fluids and to well drilling fluids produced therefrom.

BACKGROUND OF THE INVENTION

U.S. Pat. No. 4,652,384 describes the use of starches in well drilling fluids as follows:

"In drilling wells, a mud-like fluid is pumped into the hole to clean and cool the drill bit and to flush to the surface the rock cuttings that are torn loose by the drill bit. The drilling fluid must have certain physical characteristics. The most important of these is the viscosity and the water holding or retaining characteristics of the fluid.

"The use of starch in well drilling fluid is well known. It is also well known that conventional starches tend to break down at elevated temperatures for extended periods of time. Specifically, conventional starch tends to break down or burn up at temperatures of 225° F. or higher when subject to that temperature for longer than four hours. High temperatures for extended periods of time are often encountered in deeper wells during the drilling process. The breakdown of conventional starch results in an increase in the consumption of the conventional starch needed in the mud.

"There is a need in the well drilling industry for a starch which can operate for extended periods of time at elevated temperatures."

In U.S Pat. No. 4,652,384 a crosslinked starch, for well drilling fluids is disclosed. This starch is preferably cornstarch crosslinked with phosphorous oxychloride. One example of this reference uses phosphorous oxychloride crosslinked waxy corn starch. It is contended by this reference that the starch can function satisfactorily up to 32 hours at temperatures above 250° F. According to Table I of this reference, however, substantial performance degradation occurs within 24 hours in an API Fluid Loss test utilizing a starch product prepared in accordance with the teachings of this reference at a 275° F. test temperature.

U.S. Pat. No. 4,822,500 describes well drilling fluids including a saturated brine, a salt soluble in water but not in the brine, "xanthomonas" (xanthan) gum and an epichlorohydrin crosslinked hydroxypropylated starch component. The combination of starch and gum provides improved high temperature performance relative to drilling fluids employing either of the gum or the starch components alone and to drilling fluids employing the gum component in combination with a number of other waxy starch derivatives, including waxy corn starch crosslinked with phosphorous oxychloride and hydroxypropylated.

U.S. Pat. No. 4,422,947 describes a well drilling fluid containing a crosslinked potato starch together with other additives. The reference does not report high temperature duration of fluid loss properties of the fluid.

U.S. Pat. No. 4,123,366 describes a well drilling fluid made from sea water which includes both sodium carboxymethyl starch and sodium carboxymethyl cellulose as fluid loss additives.

In addition to starches, cellulosic or synthetic polymers have been used as fluid loss control additives in well drilling fluids. Exemplary references disclosing such polymers include U.S. Pat. No. 4,600,515, U.S. Pat. No. 4,652,623 and U.S. Pat. No. 4,988,450. While some such polymers may provide better high temperature characteristics than the starches and modified starches previously employed in well drilling fluids, they are generally more expensive. Consequently there is a need for starches which have improved duration of fluid loss control at high temperatures.

Additional information regarding drilling fluid compositions and the use of starches therein can be found in J. Bourchardt, "Chemicals Used in Oil-Field Operations," Chapter 2 of *Oil Field Chemistry*, pp 3–54, American Chemical Society (1989).

In the Derwent WPI database, abstract accession number 85-048247/08 (2/85), it is reported that RO 84742 describes an ion exchange resin prepared from amylopectin crosslinked with epichlorohydrin and reacted with monochloroacetic acid in weight ratio up to 10:1. There is no suggestion of using this starch or any modification thereof in a well drilling fluid.

SUMMARY OF THE INVENTION

The invention is a novel starch which provides remarkably improved high temperature fluid loss performance when incorporated into well drilling fluids. Another aspect of the invention is an improved starch-containing well drilling fluid in which the starch component is a modified starch as described herein. A still further aspect of the invention is a well drilling process which employs such a drilling fluid containing the novel starch of the invention.

The novel modified starch of the invention is derived from an unmodified starch or blend of starches having an amylopectin content of at least 80% by weight. The modified starch polymer is crosslinked with epichlorohydrin, the amount of epichlorohydrin crosslinking being equivalent to that which is obtained when a crosslinking reaction is subjected to a Brabender viscosity which reaches a maximum value and then is reduced with further crosslinking from its maximum to a value which is no more than 50% of the maximum value, and is carboxymethylated, suitably with a degree of substitution of at least 0.1 carboxymethyl groups per anhydroglucose unit. In some embodiments of the invention the modified starch polymer of the invention is also hydroxypropylated.

In addition to drilling fluids, the starches of the invention are useful in other drilling field applications which utilize higher cost polymers to obtain higher temperature tolerances, especially applications which currently employ cellulosic polymers.

DETAILED DESCRIPTION OF THE INVENTION

Well drilling fluid is also referred to as mud, drilling mud, drill fluid, drilling fluid, oil well fluid and oil well drilling fluid in the industry and these terms should be understood as interchangeable throughout this application. It will be understood that these terms refer to a fluid which is pumped into a well during the drilling operation. The well itself may be for gas, oil or any other purpose where a well drilling fluid is used.

Depending on their source, starches may contain both amylose and amylopectin molecules, or they may contain substantially all amylopectin or substantially all amylose. Typical sources of starch are wheat, potato, rice, corn and roots containing a high starch content. Waxy starches, which are virtually all amylopectin molecules, especially waxy corn starch, are preferred. Blends of waxy starches with minor amounts of amylose-containing starch may also be employed. The starch, whether a single type or a blend, which is used in preparing the modified starches of the invention should have a content of amylopectin of at least 80%, i.e., it has a maximum amylose content of 20%. More preferably the amylopectin content is at least 85%, and most preferably at least 95%.

The starch is crosslinked with epichlorohydrin, suitably in a basic aqueous starch suspension, or slurry, at a temperature and for a period of time such that the Brabender viscosity of the suspension exceeds the maximum viscosity which can be obtained in the starch suspension and then drops to about 50% or less of the maximum viscosity, as determined experimentally. Typically the slurry will contain at least 25% by weight of starch granules. The maximum Brabender viscosity is reached at a very low crosslinking density and then drops with further crosslinking, as the crosslinked system becomes increasingly dense. The viscosity will vary by the amount of crosslinking and the test conditions, i.e., temperature, concentrations, etc. Preferably, the crosslinking is continued until the viscosity decreases to a value in the range of from about 35% to 5% of the maximum viscosity. When the desired viscosity is reached, the crosslinking reaction is terminated.

The epichlorohydrin crosslinked starch may optionally then be reacted with propylene oxide to form a hydroxypropyl ether. The reaction of propylene oxide and starch is base catalyzed. Aqueous slurry reactions are generally catalyzed by 0.5 to 1% sodium hydroxide based on the dry weight of starch. Sodium sulfate or sodium chloride may be added to keep the starch from swelling during reaction with the propylene oxide. Reaction temperatures are generally in the range of about 38° to about 55° C. Propylene oxide levels generally range from about 1% to about 10% based on the dry weight of the starch. Propylene oxide-starch reactions take approximately 24 hours to complete under the conditions described and are about 60% efficient with respect to the propylene oxide. It is preferred that the epichlorohydrin crosslinked hydroxypropylated starch contain from about 0.5% to about 20% reacted propylene oxide based on the dry weight ("moisture free basis" or "MBS") of starch.

Other methods of preparing epichlorohydrin crosslinked starches and hydroxypropyl starch ethers are well known in the art and can be employed in the manufacture of the starches of the invention.

The modified starches of the invention must also be carboxymethylated. This is suitably accomplished after crosslinking and, if employed, after the hydroxypropylation reaction. Carboxymethylation is accomplished by reacting the starch with chloroacetic acid or its sodium salt. Such reactions are well known. The degree of substitution (ds) in the inventive starches is at least 0.1, more desirably at least 0.3, and preferably at least 0.40 carboxymethyl groups per anhydroglucose unit in the starch polymer. Polymers with a ds of about 0.4 or higher are especially preferred because they are stable against fermentation, however, this degree of substitution is much higher than can conventionally be achieved in a slurry reactor. Therefore for this reaction the starch slurry is desirably transferred to a paste or "autoclave" reactor. Alternatively a higher water dilution or a solvent may be employed to allow for reaction to the high degree of substitution preferably employed in the inventive starches.

Suitably the reacted starch is then drum-dried and milled to obtain a dry product. The milled dry product can then be incorporated into the oil well drilling fluid at the drill site.

At the oil well drilling site, the starch of the present invention will typically be incorporated into the mud when the consumption of the conventional starch becomes excessive. The mud is prepared in a conventional manner with the addition of the starch of the present invention. In general, oil well mud is prepared by combining clay, brine and starch. Any type of brine or clay may be employed with the starch of the present invention. The proportions of the starch, clay and brine used in the mud are well known in the art, as are the methods used to combine them. It may also be possible to use the starch of the present invention with water and clay in the absence of brine or in a brine environment free of clay when making a well drilling fluid. It is also possible to employ the starch of the present invention with an initial wet drilling fluid which does not contain starch. In other words, an operator could start the drilling operation with a well fluid which does not contain starch and still employ the starch of the present invention in drilling that well.

In practice the amount of starch added to the mud will be different for different drilling operations and each operator will use a particular amount which he believes to be superior. In most applications, the amount of starch employed in the drilling fluid will not exceed about 4 or 5 pounds per barrel of the drilling fluid.

The well treating fluids of this invention can contain other conventional wellbore additives as desired in conventional amounts. Examples of such additives include oil, viscosifiers such as hydroxyethyl cellulose, carboxymethyl cellulose, xanthan and other gums, lignosulfonate salts such as calcium or chromium lignosulfonates, emulsifiers, weighting agents, corrosion inhibitors, calcium carbonate, magnesia, other starch derivatives, and the like, as is well known in the art. In particular xanthan gum employed in the manner and relative proportions as described in U.S. Pat. No. 4,822,500 may be utilized in the drilling fluids of the invention.

Starch polymers of the present invention may be introduced into the hole in any number of ways known to those skilled in the art. Starch of the present invention may be combined with brine and clay and then added to mud made from conventional starch at the drill site prior to pumping it into the drill hole. Or, starch of the present invention may be added directly to a mud which contains conventional starch and the mud containing both starches can be pumped into the drill hole.

The invention can be used in any drilling field application where starches are currently used, including specifically the such well treating applications as completions and workover operations where densities above 1.2 g/cm$^3$ are required. Such applications include:

A. Completion and Workover Systems with Fluid Loss Control
B. Kill Fluids to Control Pressure
C. Lost Circulation Pills to Prevent Loss of Brines
   a. Unconsolidated Sands
   b. Microfractures
   c. Massive Fractures and Vugular Formations
D. Disposal and Injection Wells
E. Drilling into Productive Formations
   a. Minimize Formation Damage
   b. Protect Water and Oil Sensitive Formations
   c. Eliminate Solids Invasion
   d. Control Water Invasion
F. Perforating
   a Post Perforating Lost Circulation Pills
   b. Perforating Fluids to Prevent Invasion in Overbalanced Perforating G. Gravel Packing
  a Underreaming
  b. Sand Washing of Cased Hole Perforations
  c. Plasticizer far Two-Stage Gravel Placement
  d. Stabilizing Underreamed or Sand Washed Hole for production Screen Placement
  e. Gravel Carrier Fluid
  f. Pill Placement to Control Loss of Cleat Solutions During Gravel Placement
H. Fracturing
  a Controlling Fluid Loss
  b. Diverting for Acid Treatment.

Further, many other drilling field applications which utilize higher cost polymers because of the low temperature tolerance of starches can be readily adapted to employ the modified starches of the invention, especially such applications which currently employ cellulosic polymers.

The invention is illustrated by the following non-limiting examples.

EXAMPLES

Starches as indicated below were provided and formulated into model drilling fluids which were tested for fluid loss properties.

All fluids were prepared and tested according to standard API mud preparations guidelines using standard malt cups and a 5 spindle Hamilton Beach multimixer. The prepared fluids were placed in 316 stainless steel heat age cells. The cells were clamped into tumble oven set at the desired temperature and hot rolled for the desired time. The cells were taken out and quenched in a sink filled with cold water. API test methods were then conducted, recording the mls of fluid lost. The fluids were then replaced in the heat age cells and hot rolled for another cycle . The process was continued until complete degradation of the starch occurred.

The starches used were as follows:
Invention Examples

Example A

Epichlorohydrin crosslinked, 0.50 ds carboxymethylated, waxy corn starch. This example illustrates one preferred method of making the starch of the present invention.

To a slurry containing 4950 grams of waxy corn starch, 85.5 grams of 50% sodium hydroxide is added. The alkalized slurry is heated to 35° C. and 7 mls epichlorohydrin is added to crosslink the slurry. Reaction progress is monitored using a Brabender Viscograph. The reaction is neutralized to pH 6.89 using 40% sulfuric acid when the viscosity curve reached 18% of the maximum peak viscosity.

To 12,174 grams of the above crosslinked slurry was added 1986 grams 50% sodium hydroxide and 2625 grams of sodium monochloroacetate. The contents were heated to 60° C. and reacted for 50 minutes followed by neutralization to pH 10.51 using 40% sulfuric acid. The product was then drum dried and ground to a powder.

Example B

Epichlorohydrin crosslinked, 0.50 ds carboxymethylated, hydroxypropylated, waxy corn starch. This example illustrates one preferred method of making the starch of the present invention.

To a slurry containing 16,050 grams of waxy corn starch, 277.4 grams of 50% sodium hydroxide is added. The alkalized slurry is heated to 35° C. and 12.04 mls epichlorohydrin is added to crosslink the slurry. Reaction progress is monitored using a Brabender Viscograph. The reaction is neutralized to pH 7.25 using 40% sulfuric acid when the viscosity curve reached 28% of the maximum peak viscosity.

To 10,100 grams of the above crosslinked slurry was added 1664 grams 50% sodium hydroxide, 2199 grams of sodium monochloroacetate, and 304 mls of propylene oxide. The contents were heated to 50° C. and reacted for 50 minutes followed by neutralization to pH 10.62 using 40% sulfuric acid. The product was then drum dried and ground to a powder.

Example C

50/50 blend of the products of Examples A and B.
Comparative Examples

Example D 0.50 ds carboxymethylated corn starch.

Example E

Epichlorohydrin crosslinked, 0.50 ds carboxymethylated, corn starch. Viscograph curve was 14% of maximum peak viscosity. (Corn starch counterpart to Example A).

Example F

Epichlorohydrin crosslinked, 0.50 ds carboxymethylated, hydroxypropylated, corn starch (lower crosslink density than Example G).

Example G

Epichlorohydrin crosslinked, 0.50 ds carboxymethylated, hydroxypropylated, corn starch. Viscograph curve was 17% of maximum viscosity peak. (Corn starch counterpart to Example B).

Example H

Epichlorohydrin crosslinked, 0.50 ds carboxymethylated, hydroxypropylated, potato starch. Viscograph curve was 29% of maximum viscosity peak. (Potato starch counterpart to Example B).

Example I

Epichlorohydrin crosslinked corn starch. Viscograph curve was 28% of the maximum peak viscosity.

Example J

Epichlorohydrin crosslinked waxy corn starch. Viscograph curve was 38% of the maximum peak viscosity.

Example K

Stagel™ 141 a phosphorous oxychiloride (POCl$_3$) crosslinked potato starch of U.S. Pat. No. 4,422,947.

Example L

A phosphorous oxychloride (POCl$_3$)/epichlorohydrin crosslinked waxy corn starch.

Example M

A phosphorous oxychloride (POCl$_3$) crosslinked, hydroxypropylated corn starch.

Example N

Epichlorohydrin crosslinked, hydroxypropylated corn starch of U.S. Pat. No. 4,822,500.

Example O

Stabilose™ LV. This is a commercial 0.50 ds carboxymethylated potato starch product. Without being bound thereby, it is believed that this product may be epichlorohydrin crosslinked and may be blended with CMC (carboxymethylated cellulose).

Example P

PAC LV a low viscosity, carboxymethylated cellulose.

Example Q

Epichlorohydrin crosslinked, 0.50 ds carboxymethylated, hydroxypropylated, waxy corn starch. Viscograph curve was 55–65% of maximum viscosity.

Example R

Epichlorohydrin crosslinked, 0.50 ds carboxymethylated, hydroxypropylated, waxy potato starch. (Lower crosslink density than Example G, potato starch counterpart to Example F).

Invention Examples

Example S

Epichlorohydrin crosslinked, 0.50 ds carboxymethylated, hydroxypropylated, blend of waxy and regular corn starch. The starches were blended at a ratio of 50% waxy to 50% regular corn. The waxy corn starch was understood to contain 1% amylose whereas the regular corn starch was understood to contain 26% amylose. On this basis, the final blend provided 13.5% amylose. The Viscograph curve was 26% of maximum viscosity.

Example T

Epichlorohydrin crosslinked, 0.50 ds carboxymethylated, hydroxypropylated, blend of waxy and regular corn starch. The starches were blended at a ratio of 75% waxy to 25% regular corn. The waxy corn starch was understood to contain 1% amylose whereas the regular corn starch was understood to contain 26% amylose. On this basis, the final blend provided 7.25% amylose content. The Viscograph curve was 30% of maximum viscosity.

Example U

Epichlorohydrin crosslinked, 0.15 ds carboxymethylated, hydroxypropylated, waxy corn starch. Viscograph curve was 30% of maximum viscosity.

Comparative Examples

Example V

Epichlorohydrin crosslinked, 0.15 ds carboxymethylated, hydroxypropylated, waxy corn starch. Viscograph curve was 55–65% of maximum viscosity.

Example W

Epichlorohydrin crosslinked, 0.08 ds carboxymethylated, hydroxypropylated, potato starch. Viscograph curve was 55–65% of maximum viscosity.

Fluid loss results:

System 1

A model well drilling fluid using a saturated salt solution containing 1 g NaHCO$_3$ and 35 g API Standard Evaluation Base Clay per 350 g solution. The formulations were prepared and tested for fluid loss properties at 275° F. according to API Specification 13A: Specification for Drilling Fluid Materials, Section 11.5, Saturated Salt Water Test. Test results are reported in Table 1.

The results depicted in Table 1 show that the modified starches of the invention provide remarkably improved retention of fluid loss properties compared to the prior art and to similarly modified starches of higher amylose content.

TABLE 1

API Fluid Loss Results (mls)

Heat Aging Time (Hours) at 275° F.

| Example | 0 | 16 | 32 | 48 | 64 | 80 | 96 | 112 |
|---|---|---|---|---|---|---|---|---|
| Invention Examples | | | | | | | | |
| A | 56 | 23 | 18 | 12 | 7 | 8 | 37 | 120 |
| B | 22 | 6 | 6 | 8 | 28 | 71 | 124 | |
| C | 37 | 8 | 8 | 10 | 10 | 12 | 81 | 116 |
| Comparative Examples | | | | | | | | |
| D | 5 | 58 | 93 | 110 | | | | |
| E | 19 | 8 | 8 | 25 | 112 | | | |
| F | 6 | 12 | 48 | 82 | 95 | | | |
| G | 78 | 12 | 16 | 104 | | | | |
| H | 22 | 6 | 40 | 107 | | | | |
| I | 12 | 8 | 77 | | | | | |
| J | 17 | 8 | 6 | 9 | 91 | | | |
| K | 5 | 80 | 105 | | | | | |
| L | 8 | 26 | 86 | | | | | |
| M | 7 | 17 | 80 | | | | | |
| N | 109 | 13 | 7 | 46 | 113 | | | |
| O | 10 | 88 | 109 | | | | | |
| P | 4 | 10 | 51 | 82 | 93 | | | |
| Q | 7 | 6 | 14 | 65 | 90 | | | |
| R | 8 | 19 | 82 | | | | | |
| Invention Examples | | | | | | | | |
| S | 13 | 7 | 6 | 19 | 57 | 96 | | |
| T | 17 | 7 | 6 | 11 | 38 | 80 | | |
| U | 88 | — | 28 | 16 | 7 | 7 | 30 | 127 |
| Comparative Examples | | | | | | | | |
| V | 19 | 5 | 7 | 38 | 90 | | | |
| W | 14 | 5 | 25 | 89 | | | | |

System 2

Several of the modified starches described above were also tested for fluid loss properties in another drilling fluid system employing an API saturated salt mud containing attapulgite, as described in U.S. Pat. No. 4,652,384. The test fluid was prepared by adding 6300 grams NaCl to 15,750 mls DI water and then adding 551.25 grams attapulgite. This composition was mixed for 1 hour to form a salt gel. The modified starch was added at 5 grams of starch per 350 mls of the salt gel. Fluid loss properties on aging at 275° F., reported in Table 2, again showed improved heat aging resistance for the compositions employing starches of the invention.

TABLE 2

API Fluid Loss Results (mls)

Heat Aging Time (Hours) at 275° F.

| Example | 0 | 16 | 32 | 48 |
|---|---|---|---|---|
| Invention Examples | | | | |
| A | 63 | 15 | 34 | 107 |
| B | 24 | 9 | 65 | 80 |

TABLE 2-continued

API Fluid Loss Results (mls)

Heat Aging Time (Hours) at 275° F.

| Example | 0 | 16 | 32 | 48 |
|---------|---|----|----|----|
| Comparative Examples | | | | |
| G | 54 | 14 | 148 | |
| H | 29 | 28 | 120 | |
| K | 3 | 80 | 141 | |
| L | 6 | 68 | 143 | |
| M | 7 | 91 | 138 | |

System 3

Another test drilling fluid system was prepared by blending 360 g prehydrated gel (10 ppb Gold Seal Bentonite), 0.15 g KOH, 37 g KCl, 65 g Barite and 4 g of a modified starch. Fluid loss properties on aging at 250° F., reported in Table 3, again showed improved heat aging resistance for the compositions employing starches of the invention.

TABLE 3

API Fluid Loss Results (mls)

Heat Aging Time (Hours) at 250° F.

| Example | 0 | 16 | 32 | 48 |
|---------|---|----|----|----|
| Invention Examples | | | | |
| A | 40 | 34 | 30 | 12 |
| B | 22 | 17 | 14 | 13 |
| Comparative Examples | | | | |
| E | 30 | 15 | 28 | 129 |
| F | 16 | 34 | 102 | |
| I | 61 | 90 | | |
| J | 50 | 72 | 106 | |
| N | 157 | 49 | 85 | |
| Q | 11 | 18 | 44 | 83 |

System 4

In still another test fluid system, this one a 4% salt water system as set out in API 13A, Section 11.3, using a 285° F. heat aging temperature, the compositions prepared using starches of the invention again showed improved heat aging resistance. Results of these tests are reported in Table 4.

TABLE 4

API Fluid Loss Results (mls)

Heat Aging Time (Hours) at 285° F.

| Example | 0 | 16 | 32 | 48 | 64 | 85 | 109 | 115 | 130 |
|---------|---|----|----|----|----|----|-----|-----|-----|
| Invention Examples | | | | | | | | | |
| A | 24 | 15 | 12 | 10 | 6 | 11 | 17 | 35 | 28 |
| B | 13 | 7 | 6 | 7 | 7 | 17 | 107 | | |
| Comparative Examples | | | | | | | | | |
| F | 6 | 10 | 26 | 69 | | | | | |
| K | 5 | 6 | 60 | 83 | | | | | |
| L | 7 | 5 | 7 | 12 | 12 | 83 | | | |
| O | 8 | 18 | 53 | 83 | | | | | |
| R | 6 | 12 | 51 | 85 | | | | | |
| Q | 7 | 6 | 9 | 18 | 76 | | | | |

The starch polymers, formulations and test results described above are merely illustrative of the invention and those skilled in the art will recognize that many other variations may be employed within the teachings provided herein. Such variations are considered to be encompassed within the scope of the invention as set forth in the following claims.

I claim:

1. A modified starch polymer, obtained from an unmodified starch or blend of starches having a content of amylopectin of at least 80% by weight, the starch polymer being crosslinked with epichlorohydrin and carboxymethylated, the amount of epichlorohydrin crosslinking being equivalent to that which is obtained when a crosslinking reaction is subjected to a Brabender viscosity which reaches a maximum value and then is reduced with further crosslinking from its maximum to a value which is no more than 50% of the maximum value, and the degree of carboxymethyl substitution being at least 0.1 carboxymethyl groups per anhydroglucose unit, and the starch polymer being further modified by hydroxypropylation of the polymer.

2. A modified starch polymer as in claim 1 wherein said content of amylopectin is at least 85% by weight and said degree of carboxymethyl substitution is at least 0.3 carboxymethyl groups per anhydroglucose unit.

3. A modified starch polymer as in claim 1 wherein said content of amylopectin is at least 95% by weight.

4. A modified starch polymer as in claim 1 wherein said degree of carboxymethyl substitution is at least 0.4 carboxymethyl groups per anhydroglucose unit.

5. A modified starch polymer as in claim 1 wherein the starch polymer is hydroxypropylated to a degree which corresponds to from about 0.5% to about 20% reacted propylene oxide based on the dry weight of said unmodified starch.

6. A modified starch polymer as in claim 1 wherein said reduced Brabender viscosity value is no more than 35% of the maximum value.

7. A modified starch polymer as in claim 6 wherein the degree of carboxymethyl substitution is at least 0.40 carboxymethyl groups per anhydroglucose unit and the starch polymer is also hydroxypropylated to a degree which corresponds to from about 0.5% to about 20% of reacted propylene oxide based on the dry weight of unmodified starch.

8. A modified starch polymer as in claim 1 obtained from an unmodified starch or blend of starches which is substantially amylose-free.

9. A modified starch polymer as in claim 8 wherein said substantially amylose free starch is waxy corn starch.

10. A well treating fluid formulation comprising a mixture of starch and at least one of brine and clay wherein the starch is a modified starch polymer obtained from an unmodified starch or blend of starches having a content of amylopectin of at least 80% by weight, the starch polymer being crosslinked with epichlorohydrin and carboxymethylated, the amount of epichlorohydrin crosslinking being equivalent to that which is obtained when a crosslinking reaction is subjected to a Brabender viscosity which reaches a maximum value and then is reduced with further crosslinking from its maximum to a value which is no more than 50% of the maximum value, and the degree of carboxymethyl substitution being at least 0.1 carboxymethyl groups per anhydroglucose unit.

11. A well treating fluid as in claim 10 further comprising an xanthan gum.

12. A well treating fluid as in claim 10 further comprising at least one of hydroxyethyl cellulose, carboxymethyl cellulose, a lignosulfonate salt, an emulsifier, a weighting agent, a corrosion inhibitor, calcium carbonate, magnesia, or another starch derivative different from said modified starch polymer.

13. A well treating fluid as in claim 10 wherein the amount of epichlorohydrin crosslinking of said modified starch polymer is equivalent to that which is obtained when a crosslinking reaction is subjected to a Brabender viscosity which reaches a maximum value and then is reduced with further crosslinking from its maximum to a value which is no more than 35% of the maximum value.

14. A well treating fluid as in claim 13 wherein the degree of carboxymethyl substitution on the modified starch polymer is at least 0.40 carboxymethyl groups per anhydroglucose unit.

15. A well treating fluid as in claim 14 wherein the modified starch polymer is derived from a substantially amylose free starch.

16. A well treating fluid as in claim 14 wherein at least a portion of said modified starch polymer is hydroxypropylated.

17. In a well treating process comprising the step of providing a treating fluid comprising a mixture of brine, clay and a fluid loss polymer to a bore hole, the improvement that at least a portion of the fluid loss polymer is a modified starch polymer obtained from an unmodified starch or blend of starches having a content of amylopectin of at least 80% by weight, the starch polymer being crosslinked with epichlorohydrin and carboxymethylated, the amount of epichlorohydrin crosslinking being equivalent to that which is obtained when a crosslinking reaction is subjected to a Brabender viscosity which reaches a maximum value and then is reduced with further crosslinking from its maximum to a value which is no more than 50% of the maximum value, and the degree of carboxymethyl substitution being at least 0.1 carboxymethyl groups per anhydroglucose unit.

18. A well treating process as in claim 17 wherein the drilling fluid is subjected to a temperature of about 275° F. or higher within said bore hole for a period exceeding 24 hours.

19. A method of preparing a modified starch for well drilling comprising the steps of:

crosslinking an unmodified starch having a content of amylopectin of at least 80% by weight, to a degree corresponding to a Brabender viscosity which reaches a maximum value and then is reduced with further crosslinking from its maximum to a value which is no more than 50% of the maximum value, hydroxypropylating the starch to a degree which corresponds to from about 0.5% to about 20% reacted propylene oxide based on the dry weight of unmodified starch, and carboxymethylating the resulting crosslinked starch polymer to a degree of substitution of at least 0.1 carboxymethyl groups per anhydroglucose unit.

20. A method as in claim 19 wherein said unmodified starch is waxy corn starch, said degree of carboxymethyl substitution is at least 0.40 carboxymethyl groups per anhydroglucose unit, and said reduced Brabender viscosity is no more than 35% of said maximum value.

21. A well treating fluid as in claim 10 comprising a mixture of said modified starch polymer, said brine and said clay.

* * * * *